United States Patent
Knapp et al.

(10) Patent No.: US 8,177,492 B2
(45) Date of Patent: May 15, 2012

(54) PASSAGE OBSTRUCTION FOR IMPROVED INLET COOLANT FILLING

(75) Inventors: James N. Knapp, Sanford, ME (US); Paul M. Lutjen, Kennebunkport, ME (US)

(73) Assignee: United Technologies Corporation, Hartford, CT (US)

( * ) Notice: Subject to any disclaimer, the term of this patent is extended or adjusted under 35 U.S.C. 154(b) by 1107 days.

(21) Appl. No.: 12/074,501

(22) Filed: Mar. 4, 2008

(65) Prior Publication Data

US 2009/0226300 A1    Sep. 10, 2009

(51) Int. Cl.
F01D 5/20 (2006.01)
F01D 11/08 (2006.01)
F04D 29/08 (2006.01)
F04D 29/18 (2006.01)

(52) U.S. Cl. .................................... 415/173.1
(58) Field of Classification Search ............... 415/173.1, 415/173.4, 115, 97 R; 416/97 R
See application file for complete search history.

(56) References Cited

U.S. PATENT DOCUMENTS

| | | | |
|---|---|---|---|
| 3,864,199 A * | 2/1975 | Meginnis | 428/596 |
| 4,573,866 A | 3/1986 | Sandy, Jr. et al. | |
| 4,642,024 A | 2/1987 | Weidner | |
| 4,650,394 A | 3/1987 | Weidner | |
| 4,650,395 A | 3/1987 | Weidner | |
| 5,374,161 A | 12/1994 | Kelch et al. | |
| 5,375,973 A * | 12/1994 | Sloop et al. | 415/173.1 |
| 5,480,281 A | 1/1996 | Correia | |
| 5,486,090 A | 1/1996 | Thompson et al. | |
| 5,538,393 A | 7/1996 | Thompson et al. | |
| 5,584,651 A | 12/1996 | Pietraszkiewicz et al. | |
| 5,609,469 A | 3/1997 | Worley et al. | |
| 5,649,806 A | 7/1997 | Scricca et al. | |
| 5,842,829 A * | 12/1998 | Cunha et al. | 415/115 |
| 5,993,150 A | 11/1999 | Liotta et al. | |
| 6,183,194 B1 * | 2/2001 | Cunha et al. | 415/115 |
| 6,220,815 B1 * | 4/2001 | Rainous et al. | 415/174.5 |
| 6,254,333 B1 | 7/2001 | Merry | |
| 6,890,154 B2 * | 5/2005 | Cunha | 416/97 R |
| 6,905,302 B2 | 6/2005 | Lee et al. | |
| 6,974,308 B2 * | 12/2005 | Halfmann et al. | 416/97 R |
| 7,033,138 B2 | 4/2006 | Tomita et al. | |
| 7,284,954 B2 | 10/2007 | Parker et al. | |
| 7,517,189 B2 * | 4/2009 | Camus | 415/173.1 |
| 2006/0140753 A1 * | 6/2006 | Romanov et al. | 415/173.1 |
| 2007/0081890 A1 | 4/2007 | Lutjen et al. | |

* cited by examiner

*Primary Examiner* — Edward Look
*Assistant Examiner* — Su Htay
(74) *Attorney, Agent, or Firm* — Kinney & Lange, P.A.

(57) ABSTRACT

A cooled gas turbine engine component includes a cooling passage, one or more cooling inlet apertures in flow communication with a coolant supply and a first end of the cooling passage, and a coolant flow obstruction inside the cooling passage between the one or more cooling inlet apertures and a second end of the cooling passage and configured to direct a portion of coolant from the one or more cooling inlet apertures toward the first end of the cooling passage.

25 Claims, 5 Drawing Sheets

US 8,177,492 B2

PASSAGE OBSTRUCTION FOR IMPROVED INLET COOLANT FILLING

STATEMENT OF GOVERNMENT INTEREST

This invention was made with Government support under N00019-02-C-3003 awarded by the United States Air Force. The Government has certain rights in this invention.

BACKGROUND

The present invention relates to gas turbine engines. In particular, the present invention relates to cooled components for gas turbine engines.

A gas turbine engine commonly includes a fan, a compressor, a combustor, a turbine, and an exhaust nozzle. During engine operation, working medium gases, for example air, are drawn into and compressed in the compressor. The compressed air is channeled to the combustor where fuel is added to the air and the air/fuel mixture is ignited. The products of combustion are discharged to the turbine section, which extracts work from these products to produce useful thrust to power, for example, an aircraft in flight.

The compressor and turbine commonly include alternating stages of rotor blades and stator vanes. Compressor and turbine rotors include stationary annular fluid seals surrounding the blades and acting to contain and direct the flow of working medium fluid through successive stages. Compressor and turbine rotor seals, sometimes referred to as outer air seals, commonly include arcuate seal segments circumferentially arranged to form a ring about the engine axis radially outward of the blades. The outer air seal including the ring of arcuate segments is attached to the engine case by, for example, one or more support rings.

The operating temperatures of some engine stages, such as in the high pressure turbine stages, may exceed the material limits of the seal segments and therefore necessitate cooling the segments by using, for example, compressor bleed air directed to the segment through, for example, the support rings. Cooled seal segments may include cooling features such as film cooling holes, internal cooling passages, and impingement cooling plates. Increasing the effectiveness of internal cooling passages is a common challenge in rotor seal design. Prior rotor seals have struggled to increase the filling of internal cooling passages with cooling fluid flow. In particular, prior art seals have exhibited inadequate filling toward the cooling passage end walls adjacent the axial inter-segment surfaces where adjacent seal segments adjoin.

SUMMARY

A cooled gas turbine engine component includes a cooling passage, one or more cooling inlet apertures in flow communication with a coolant supply and a first end of the cooling passage, and a coolant flow obstruction inside the cooling passage between the cooling inlet apertures and a second end of the cooling passage and configured to direct a portion of coolant from the cooling inlet apertures toward the first end of the cooling passage.

DETAILED DESCRIPTION

Figure 1:
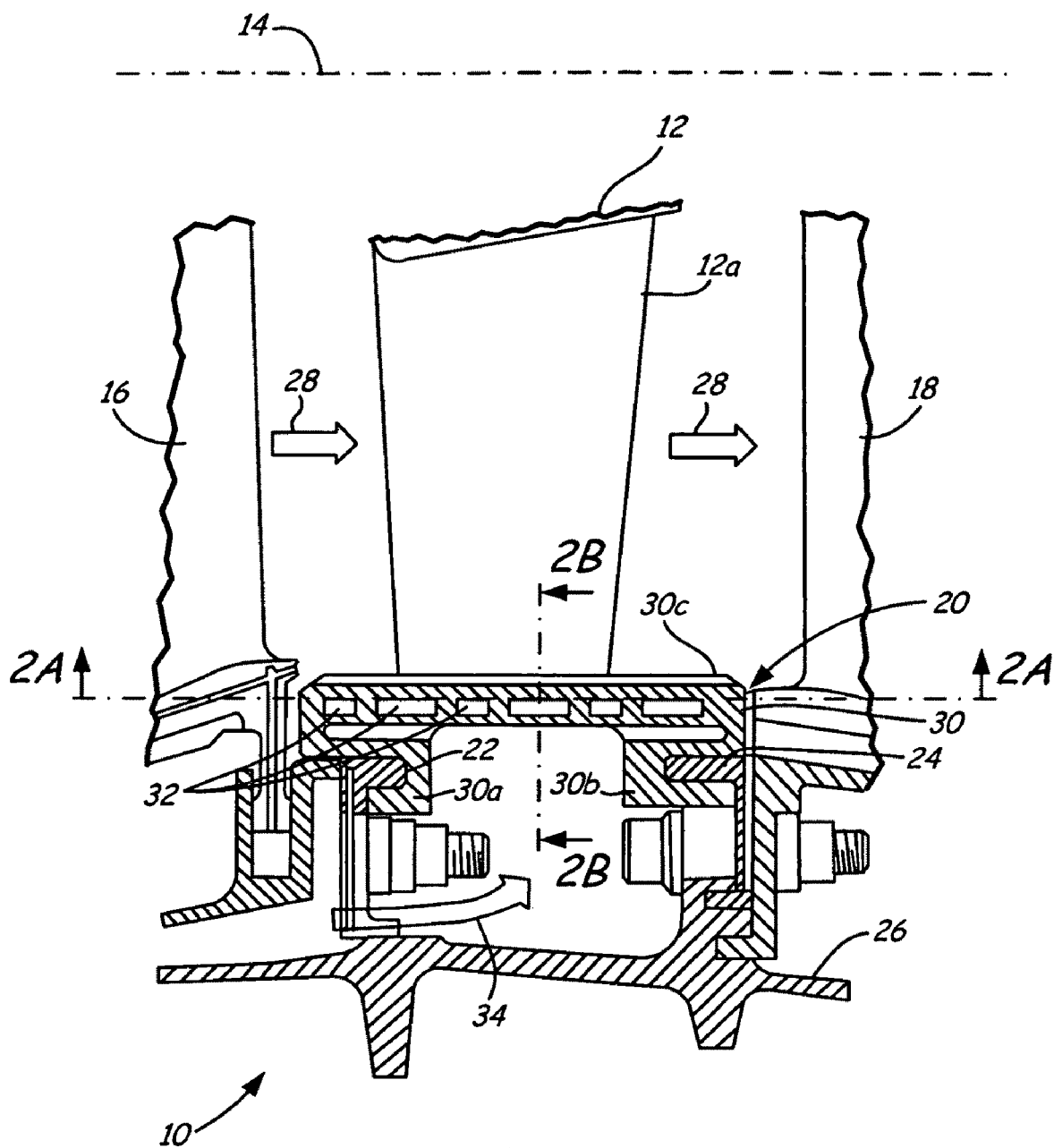
FIG. 1 is a partial axial section view of a gas turbine engine rotor and case assembly including a segmented rotor seal according to the present invention.

FIG. 1 is a partial axial section view of a gas turbine engine rotor and case assembly 10, which includes a rotor, such as turbine rotor 12, engine axis of rotation 14, stators 16 and 18, rotor seal 20, supports 22 and 24, and case 26. Turbine rotor 12 may be, for example, a high pressure turbine rotor stage including a circumferential array of blades 12a configured to be connected to and rotate with a rotor disc (not shown) about engine axis 14. Immediately upstream and downstream of rotor 12 are stators 16 and 18, which may be, for example, stationary turbine nozzles including circumferential arrays of vanes configured to guide working medium fluid 28 flow through successive turbine stages, such as through turbine rotor 12. Circumscribing the tips of blades 12a is rotor seal 20. Rotor seal 20 is connected to engine case 26 by supports 22 and 24. Rotor seal 20 may include a plurality of arcuate seal segments 30 circumferentially arranged to form an annular ring surrounding rotor blades 12a. Each of the seal segments 30 may include, as shown in FIG. 1, forward and aft hooks 30a, 30b, rub strip 30c, and cooling passages 32. Forward and aft hooks 30a, 30b may be configured to mount seal segment 30 to supports 22, 24 respectively. Rub strip 30c may be arranged on the radially inner surface of seal segment 30 adjacent the tips of blades 12a. Cooling passages 32 may extend generally circumferentially from first axial inter-segment surface 31a to second axial inter-segment surface 31b and between the radially outer and inner circumferential surfaces of segment 30.

During engine operation, blades 12a rotate about engine axis 14, and seal 20 acts to contain and direct working medium fluid 28 around blades 12a. Blades 12a rotate in close proximity with rotor seal 20 to minimize the amount of working medium fluid 28 that escapes the primary flow path into the space between the tip of blades 12a and seal 20. In some cases, the tips of blades 12a may contact seal 20. Each of seal segments 30 may therefore include rub strip 30c made from an abradable material, such as a metallic honeycomb strip or a ceramic abradable material, capable of withstanding contact with blades 12a. Because the operating temperatures of the gas turbine rotor 10 may exceed the material limits of seal segments 30, seal segments 30 may include cooling features, such as cooling passages 32. Cooling passages 32 may be configured to receive cooling fluid, such as compressor bleed air 34, to cool seal segment 30.

Figure 2A:
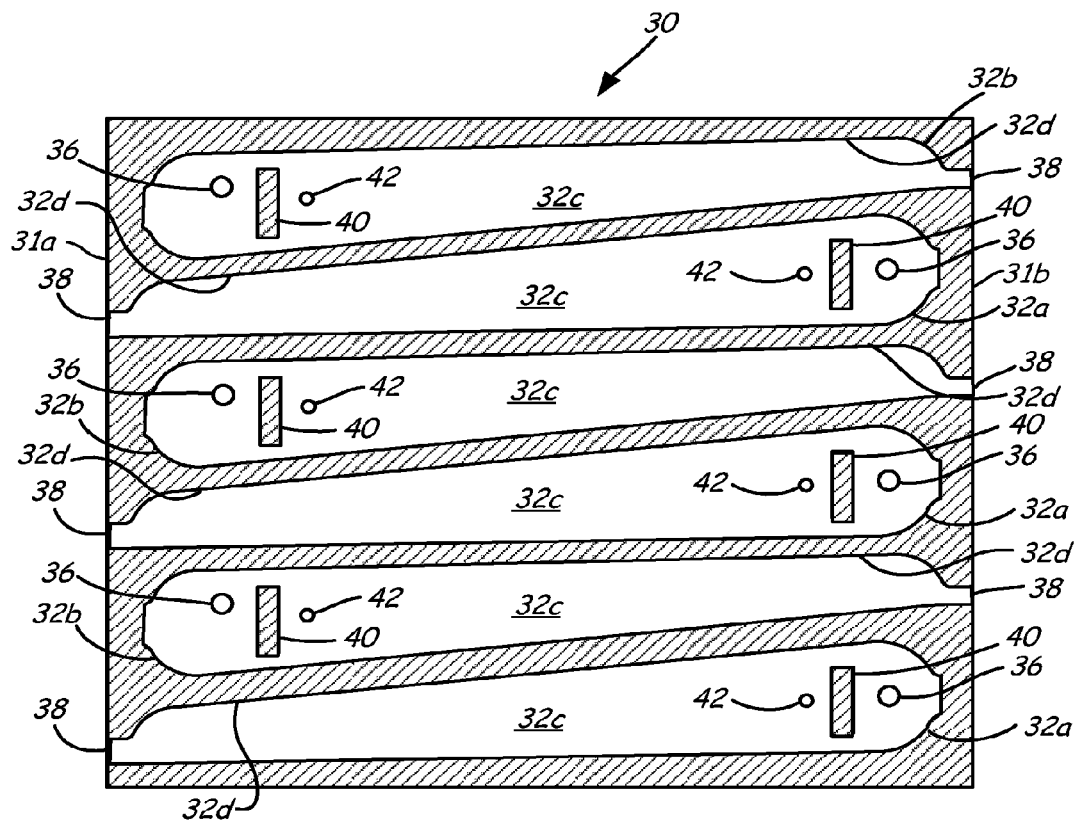
FIGS. 2A and 2B are section views of a seal segment from the rotor seal of FIG. 1.
Figure 2B:
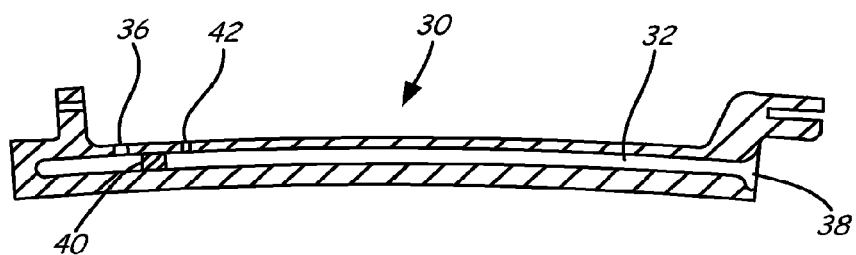

FIGS. 2A and 2B are section views of seal segment 30 with cooling passages 32, which include passages 32a and 32b. FIG. 2A is a circumferential section of seal segment 30. FIG. 2B is a radial section of seal segment 30. In FIG. 2A, each of cooling passages 32 may include cooling inlet aperture 36, cooling exit aperture 38, and coolant flow obstruction 40. The shape of cooling passages 32 is generally defined by major top and bottom surfaces, such as top surface 32c, and minor side surfaces, such as side surface 32d, connecting the major top and bottom surfaces. Cooling inlet aperture 36 is in flow communication with a coolant supply, such as compressor bleed air 34 shown in FIG. 1, and a first end of cooling passage 32. Inlet aperture 36 may be arranged toward a longitudinal center of passage 32 as shown in cooling passages 32a. Alternatively, inlet aperture 36 may be offset from center as shown in cooling passages 32b. Cooling exit aperture 38 is in flow communication with a second end of cooling passage 32 and, for example, a space between adjacent seal segments 30. Coolant flow obstruction 40 is arranged inside cooling passage 32 between cooling inlet aperture 36 and the second end of cooling passage 32. Cooling passage 32 may also include resupply aperture 42 in flow communication with the coolant supply and cooling passage 32. As shown in FIGS. 2A and 2B, resupply aperture 42 may be arranged between flow obstruction 40 and exit aperture 38.

During engine operation, each of seal segments 30 may be cooled using, for example, compressor bleed air 34 directed to seal segment 30 through supports 22, 24. Some of compressor bleed air 34 may enter each of cooling passages 32 through cooling inlet aperture 36, flow through cooling passage 32, and exit through cooling exit aperture 38 to cool axial inter-segment surfaces 31a and 31b of adjacent seal segments 30. Prior rotor seals have struggled to increase the filling of internal cooling passages with cooling fluid flow. In particular, prior seals have exhibited inadequate filling toward the cooling passage end wall adjacent inter-segment surface 31a and 31b and the cooling inlet aperture. Inter-segment surfaces 31a and 31b are axial surfaces of seal segment 30 abutting an adjacent seal segment. The regions of the seal segment adjacent inter-segment surface 31a and 31b may experience increased thermal loads, because there is a tendency for the inter-segment junction between adjoining seal segments to ingest hot working medium gas as the pressure side of the blades pass the junction during engine operation.

Figure 3:
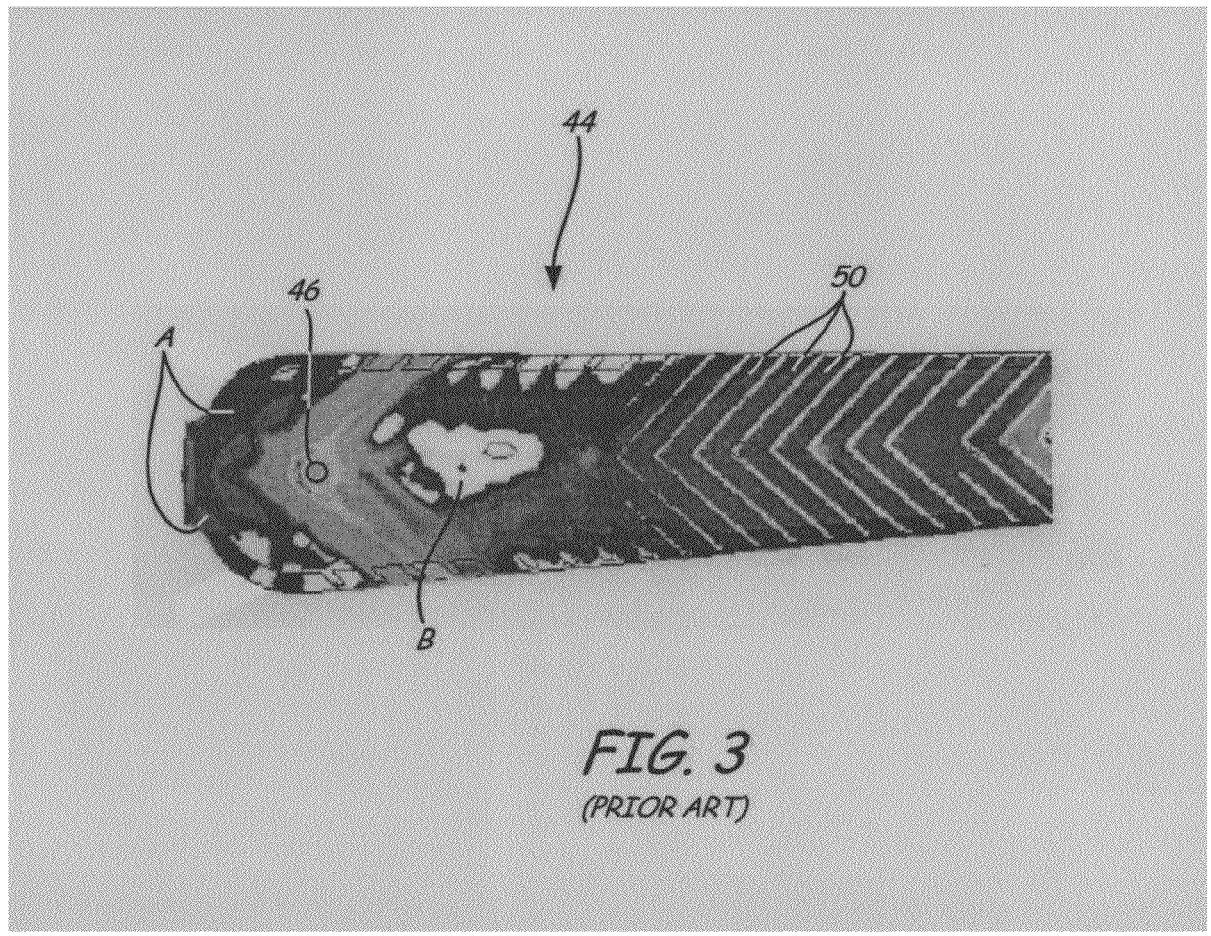
FIG. 3 is a Mach number plot showing coolant fluid flow in the cooling passage of a prior art rotor seal.

FIG. 3 is a Mach number plot showing the results of Computational Fluid Dynamics ("CFD") analysis performed on a model of a prior art rotor seal including cooling passage 44. The contours of FIG. 3 represent different cooling fluid flow velocities. Lower fluid flow velocities correspond to regions of cooling passage 44 experiencing inadequate filling with cooling fluid and are represented in FIG. 3 by the darkest gray and white regions. In FIG. 3, cooling passage 44 includes cooling inlet aperture 46 and trip strips 50. Trip strips 50 generate turbulence in a cooling fluid as it passes over a surface to enhance heat transfer. The feature is repeated in the streamwise direction from the end of passage 44 adjacent inlet aperture 46 toward the exit aperture 38 (shown in FIGS. 2A and 2B). Region A, which is generally toward the end of passage 44 adjacent inlet aperture 46 (and adjacent the inter-segment surface), exhibits inadequate cooling fluid flow, and therefore inadequate filling of cooling passage 44 with cooling fluid. Additionally, region B downstream of inlet aperture 46 also exhibits inadequate cooling fluid filling.

In order to improve cooling fluid filling of internal cooling passages, embodiments of the present invention employ coolant flow obstructions to redirect fluid flow to previously inadequately filled regions of the cooling passages. In FIGS. 2A and 2B, cooling passage 32 includes coolant flow obstruction 40. Obstruction 40 is located between inlet aperture 36 and exit aperture 38 at the second end of cooling passage 32. In the embodiment shown in FIGS. 2A and 2B, obstruction 40 includes a generally rectangular shape. Obstruction 40 may act to redirect and thereby improve cooling fluid flow inside cooling passage 32 in, for example, the region between inlet aperture 36 and the first end of cooling passage 32 adjacent inlet aperture 36. Cooling passage 32 may also include resupply aperture 42, which aperture 42 may act to increase fluid flow and thereby cooling fluid filing in regions downstream of obstruction 40 from inlet aperture 36.

Figure 4A:
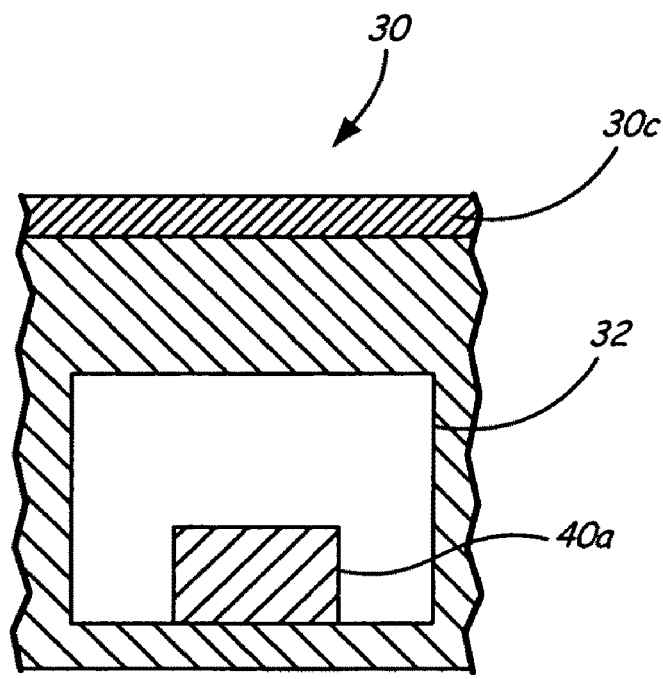
FIGS. 4A and 4B are broken axial section views of the seal segment of FIG. 2.
Figure 4B:
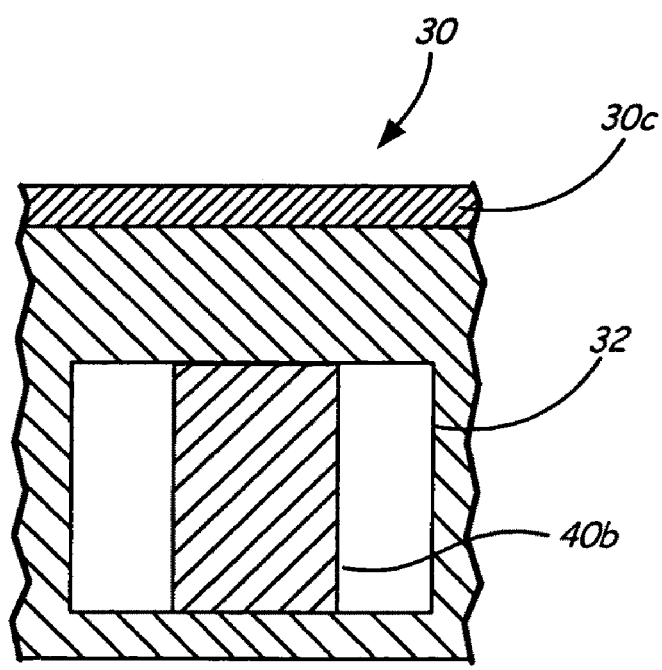

The size and shape of obstruction 40 shown in FIGS. 2A and 2B may vary in different embodiments of the present invention. FIGS. 4A and 4B are detailed axial section views of seal segment 30 including cooling passage 32 with coolant flow obstructions of varying heights. In the embodiment of FIG. 4A, cooling passage 32 includes obstruction 40a that extends only partially into cooling passage 32. In the embodiment of FIG. 4B, obstruction 40b extends across cooling passage 32.

Figure 5A:
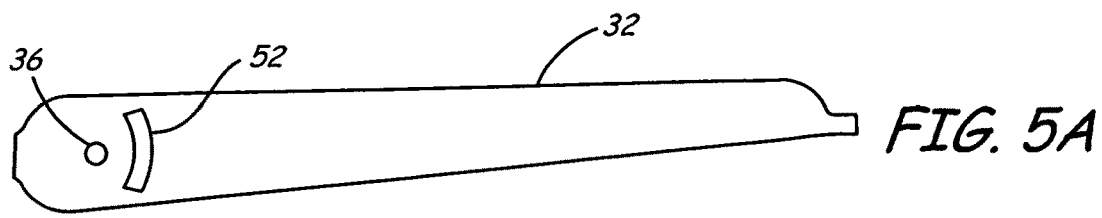
FIGS. 5A-5G are schematics illustrating alternative embodiments of the present invention including coolant flow obstructions of various shapes.
Figure 5B:
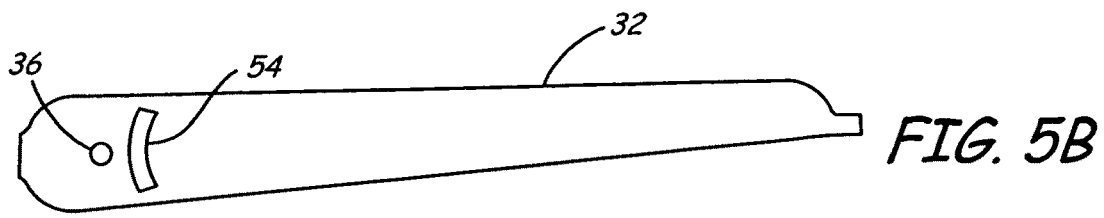
Figure 5C:
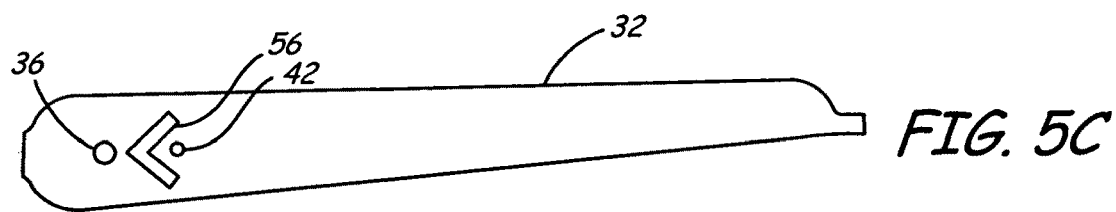
Figure 5D:
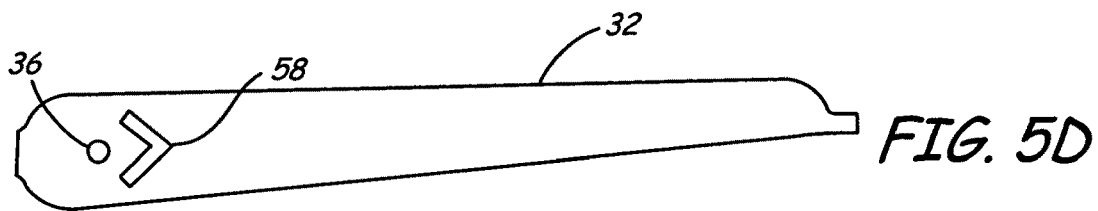
Figure 5E:
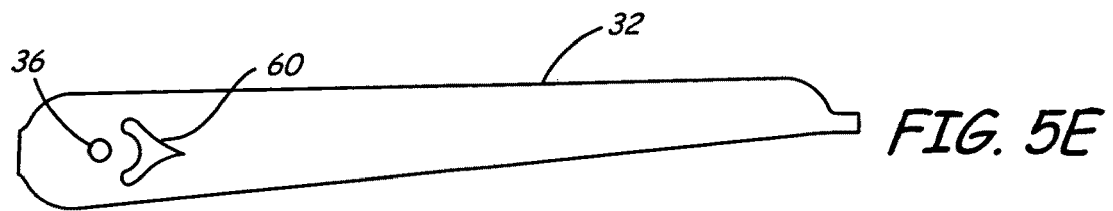
Figure 5F:
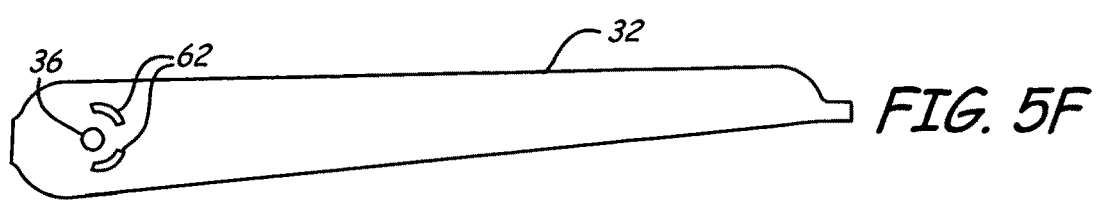
Figure 5G:
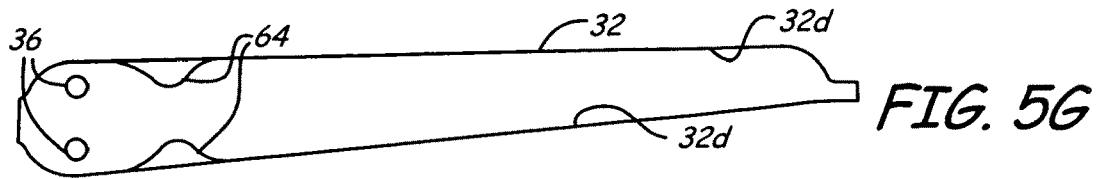

FIGS. 5A-5G schematically illustrate alternative embodiments of the present invention including coolant flow obstructions of various shapes. In FIG. 5A, cooling passage 32 includes obstruction 52 having a generally arcuate shape with the concave side facing inlet aperture 36. In FIG. 5B, cooling passage 32 includes obstruction 54 having a generally arcuate shape with the convex side facing inlet aperture 36. In FIG. 5C, cooling passage 32 includes chevron shaped obstruction 56 arranged with the apex of obstruction 56 pointed toward cooling inlet aperture 36. In the embodiment of FIG. 5C, obstruction 56 is arranged between cooling inlet aperture 36 and cooling resupply aperture 42. As discussed above, cooling resupply aperture 42 is in flow communication with the coolant supply and cooling passage 32, and may be configured to increase coolant filling downstream of obstruction 56. In FIG. 5D, cooling passage 32 includes chevron shaped obstruction 58 arranged with the apex of obstruction 58 pointing away from inlet aperture 36. In FIG. 5E, cooling passage 32 includes generally triangular shaped obstruction 60 with a concave base arranged adjacent inlet aperture 36. In FIG. 5F, cooling passage 32 includes two arcuate obstructions 62 arranged generally on either side of the center of passage 32 adjacent inlet aperture 36. Finally, in FIG. 5G, cooling passage 32 includes two side wall protrusion obstructions 64 protruding from minor side surfaces 32d toward the center of passage 32 adjacent two inlet apertures 36. Inlet apertures 36 are arranged generally on either side of the center of passage 32.

Embodiments of the present invention have several advantages over prior designs. Cooled rotor seals according to the present invention increase the effectiveness of cooling passages in seal segments by employing a coolant flow obstruction to redirect cooling fluid flow and thereby increase cooling fluid filling in previously inadequately filled regions of the seal segment. Additionally, embodiments of the present invention may include a cooling resupply aperture configured to increase cooling fluid filling in the cooling passage downstream of the coolant flow obstruction. Cooling fluid filling in embodiments of the present invention is particularly increased toward the cooling passage end wall adjacent the inter-segment surface, which surface is susceptible to high thermal loads from hot working medium gas ingested into the junction between adjacent seal segments. Increased cooling in rotor seals according to the present invention reduces the risk of material failures due to thermo-mechanical stress on the seals and generally increases engine operating efficiency, both of which reduce costs associated with operating and maintaining the engine.

Although the present invention has been described with reference to preferred embodiments, workers skilled in the art will recognize that changes may be made in form and detail without departing from the spirit and scope of the invention.

The invention claimed is:
1. A cooled gas turbine engine component comprising:
an elongate cooling passage comprising:
a first major surface;
a second major surface;
a plurality of minor surfaces connecting the first major surface to the second major surface, the plurality of minor surfaces defining a first end of the elongate cooling passage and a second end of the elongate cooling passage;

one or more cooling inlet apertures extending through the first major surface and being displaced from the first end to define a space between the one or more cooling inlet apertures and one of the plurality of minor surfaces defining the first end, the one or more cooling inlet apertures being in flow communication with a coolant supply and the first end of the cooling passage;

a cooling exit aperture extending through one of the plurality of minor surfaces at the second end; and a coolant flow obstruction inside the cooling passage between the one or more cooling inlet apertures and the second end of the cooling passage and configured to direct a portion of coolant from the one or more cooling inlet apertures toward the first end of the cooling passage and into the space;

wherein the coolant flow obstruction comprises a chevron arranged with an apex pointed toward the cooling exit aperture, wherein the coolant flow obstruction and the one or more cooling inlet apertures are centered axially between minor surfaces.

2. The component of claim 1, wherein the coolant flow obstruction is closer to the one or more cooling inlet apertures than to the second end of the elongate cooling passage.

3. The component of claim 1, wherein the coolant flow obstruction extends into the elongate cooling passage from one of the first or the second major surfaces and terminates between the first and second major surfaces.

4. The component of claim 1, wherein the coolant flow obstruction extends across the elongate cooling passage from one of the first major surface or the second major surface to the other of the first major surface or the second major surface.

5. The component of claim 1, wherein the elongate cooling passage comprises a plurality of trip strips arranged on a major surface of the cooling passage.

6. The component of claim 1 further comprising:
a cooling resupply aperture in flow communication with the coolant supply and the first end of the elongate cooling passage, wherein the coolant flow obstruction is arranged between the one or more cooling inlet apertures and the cooling resupply aperture.

7. The component of claim 1, wherein the elongate cooling passage is tapered from the first end toward the second end.

8. The component of claim 1, wherein the one or more inlet apertures comprise two inlet apertures arranged on either side of a center of the elongate cooling passage.

9. A gas turbine engine rotor seal segment comprising:
a coolant supply surface configured to be in flow communication with a coolant supply;
a seal surface configured to be in flow communication with a working medium fluid flow and arranged radially outward of a plurality of turbine blades;
a first inter-segment surface extending axially between the coolant supply surface and the seal surface;
a second inter-segment surface circumferentially offset from the first inter-segment surface and extending axially between the coolant supply surface and the seal surface; and
one or more cooling passages between the coolant supply surface and the seal surface and extending circumferentially between the first and the second inter-segment surfaces so as to be tapered, wherein each of the cooling passages comprises:
one or more cooling inlet apertures extending through the coolant supply surface and in flow communication with the coolant supply and spaced circumferentially from a first end of the cooling passage;
a cooling exit aperture extending through the second inter-segment surface and in flow communication with the one or more cooling inlet apertures and a second end of the cooling passage and spaced circumferentially from the one or more cooling inlet apertures; and
a coolant flow obstruction inside the cooling passage between the one or more cooling inlet apertures and the cooling exit aperture and configured to direct a portion of coolant from the one or more cooling inlet apertures toward the first end of the cooling passage into space between the first end of the cooling passage and the one or more cooling inlet apertures to cool the first inter-segment surface;
wherein the coolant flow obstruction comprises an arcuate shape with a concave side facing the one or more cooling inlet apertures, wherein the coolant flow obstruction and the one or more cooling inlet apertures are centered axially between minor surfaces.

10. The rotor seal segment of claim 9, wherein the coolant flow obstruction is closer to the one or more cooling inlet apertures than to the cooling exit aperture.

11. The rotor seal segment of claim 9, wherein the coolant flow obstruction extends partially into the cooling passage from one of the coolant supply surface and the seal surface.

12. The rotor seal segment of claim 9, wherein the coolant flow obstruction extends across the cooling passage from the coolant supply surface to the seal surface.

13. The rotor seal segment of claim 9 further comprising:
a cooling resupply aperture in flow communication with the coolant supply and the first end of the cooling passage, wherein the coolant flow obstruction is arranged between the one or more cooling inlet apertures and the cooling resupply aperture.

14. The rotor seal segment of claim 9, wherein the cooling exit aperture is in flow communication with the second end of the cooling passage offset from an axial center of the cooling passage.

15. The rotor seal segment of claim 9, wherein the one or more inlet cooling apertures comprise two inlet apertures arranged on either side of a center of the cooling passage.

16. A gas turbine engine rotor seal segment comprising:
a coolant supply surface configured to be in flow communication with a coolant supply;
a seal surface configured to be in flow communication with a working medium fluid flow and arranged radially outward of a plurality of turbine blades;
a first inter-segment surface extending axially between the coolant supply surface and the seal surface;
a second inter-segment surface circumferentially offset from the first inter-segment surface and extending axially between the coolant supply surface and the seal surface; and
one or more cooling passages between the coolant supply surface and the seal surface and extending circumferentially between the first and the second inter-segment surfaces so as to be tapered, wherein each of the cooling passages comprises:
one or more cooling inlet apertures extending through the coolant supply surface and in flow communication with the coolant supply and spaced circumferentially from a first end of the cooling passage;

a cooling exit aperture extending through the second inter-segment surface and in flow communication with the one or more cooling inlet apertures and a second end of the cooling passage and spaced circumferentially from the one or more cooling inlet apertures; and a coolant flow obstruction inside the cooling passage between the one or more cooling inlet apertures and the cooling exit aperture and configured to direct a portion of coolant from the one or more cooling inlet apertures toward the first end of the cooling passage into space between the first end of the cooling passage and the one or more cooling inlet apertures to cool the first inter-segment surface;

wherein the coolant flow obstruction comprises an arcuate shape with a concave side facing the cooling exit aperture, wherein the coolant flow obstruction and the one or more cooling inlet apertures are centered axially between minor surfaces.

17. The rotor seal segment of claim 16 further comprising: a cooling resupply aperture in flow communication with the coolant supply and the first end of the cooling passage, wherein the coolant flow obstruction is arranged between the one or more cooling inlet apertures and the cooling resupply aperture.

18. The rotor seal segment of claim 16, wherein at the cooling exit aperture is in flow communication with the second end of the cooling passage offset from an axial center of the cooling passage.

19. The rotor seal segment of claim 16, wherein the one or more inlet cooling apertures comprise two inlet apertures arranged on either side of a center of the cooling passage.

20. A gas turbine engine rotor seal segment comprising:
a coolant supply surface configured to be in flow communication with a coolant supply;
a seal surface configured to be in flow communication with a working medium fluid flow and arranged radially outward of a plurality of turbine blades;
a first inter-segment surface extending axially between the coolant supply surface and the seal surface;
a second inter-segment surface circumferentially offset from the first inter-segment surface and extending axially between the coolant supply surface and the seal surface; and
one or more cooling passages between the coolant supply surface and the seal surface and extending circumferentially between the first and the second inter-segment surfaces so as to be tapered, wherein each of the cooling passages comprises:
one or more cooling inlet apertures extending through the coolant supply surface and in flow communication with the coolant supply and spaced circumferentially from a first end of the cooling passage;
a cooling exit aperture extending through the second inter-segment surface and in flow communication with the one or more cooling inlet apertures and a second end of the cooling passage and spaced circumferentially from the one or more cooling inlet apertures; and
a coolant flow obstruction inside the cooling passage between the one or more cooling inlet apertures and the cooling exit aperture and configured to direct a portion of coolant from the one or more cooling inlet apertures toward the first end of the cooling passage into space between the first end of the cooling passage and the one or more cooling inlet apertures to cool the first inter-segment surface;
wherein the coolant flow obstruction comprises a triangle having a concave base arranged adjacent the one or more cooling inlet apertures, wherein the coolant flow obstruction and the one or more cooling inlet apertures are centered axially between minor surfaces.

21. The rotor seal segment of claim 20 further comprising:
a cooling resupply aperture in flow communication with the coolant supply and the first end of the cooling passage, wherein the coolant flow obstruction is arranged between the one or more cooling inlet apertures and the cooling resupply aperture.

22. The rotor seal segment of claim 20, wherein the cooling exit aperture is in flow communication with the second end of the cooling passage offset from an axial center of the cooling passage.

23. The rotor seal segment of claim 20, wherein the one or more inlet cooling apertures comprise two inlet apertures arranged on either side of a center of the cooling passage.

24. A cooled gas turbine engine component comprising:
an elongate cooling passage comprising:
a first major surface;
a second major surface;
a plurality of minor surfaces connecting the first major surface to the second major surface, the plurality of minor surfaces defining a first end of the elongate cooling passage and a second end of the elongate cooling passage;
one or more cooling inlet apertures extending through the first major surface and being displaced from the first end to define a space between the one or more cooling inlet apertures and one of the plurality of minor surfaces defining the first end, the one or more cooling inlet apertures being in flow communication with a coolant supply and the first end of the cooling passage;
a cooling exit aperture extending through one of the plurality of minor surfaces at the second end;
a coolant flow obstruction inside the cooling passage between the one or more cooling inlet apertures and the second end of the cooling passage and configured to direct a portion of coolant from the one or more cooling inlet apertures toward the first end of the cooling passage and into the space, wherein the coolant flow obstruction comprises a chevron arranged with an apex pointed toward the one or more cooling inlet apertures; and
a cooling resupply aperture extending through the coolant supply surface within the chevron;
wherein the coolant flow obstruction and the one or more cooling inlet apertures are centered axially between minor surfaces.

25. The component of claim 24, wherein the elongate cooling passage is tapered from the first end toward the second end.

* * * * *